Feb. 27, 1934.   A. B. STARR   1,949,361
TOASTER DEVICE
Filed Feb. 12, 1930   2 Sheets-Sheet 2

INVENTOR
Alden B. Starr
BY
ATTORNEY

Patented Feb. 27, 1934

1,949,361

UNITED STATES PATENT OFFICE 1,949,361

TOASTER DEVICE

Alden B. Starr, Brooklyn, N. Y., assignor to Knapp-Monarch Company, a corporation of Missouri Application February 12, 1930. Serial No. 427,739

15 Claims. (Cl. 219—19)

My invention relates to toaster devices, and more particularly to a new and improved type of automatic or continuous toaster.

My invention has for an object the production of a toaster for the conversion of slices of bread into toast, which is adapted for continuous operation, and is provided with a conveyor for passing the slices of bread between a pair of members producing radiant heat.

Another object of my invention is the provision of simple means for preventing uneven toasting of a slice of bread upon one side or the other.

A further object of my invention is the provision of a simple means for distributing the heat from the radiant source over the surfaces of a slice of bread being toasted.

Other objects are the provisions of means whereby the toast is tilted from side to side during its passage through the toaster in such a fashion as to distribute the toasting effect uniformly upon opposite sides, whereby a smoothly and evenly toasted slice is obtained; and means for automatically discharging the toast from the device.

Still other objects of my invention are the provision of a new and simplified supporting frame for steadying, supporting, and guiding the toast during its passage through the toaster that minimizes the concentration of heat upon any particular spot of the toast.

Briefly, my toaster embodies a moving chain, an oven having guiding elements and the heat producing elements mounted so as to be given a sidewise teetering movement for the purpose of tilting the bread slice to uniformly distribute the heat upon both sides of the toast as it passes through the toaster, the guiding vanes or dampers in the oven being constructed so as to control the currents of heated air passing from the source of heat to the slice of bread so as to distribute the heat evenly over the entire surface of the slice. By the foregoing means I am enabled to produce a new and simplified toaster, by which new and improved results are obtained.

Further objects of my invention and structural details of my invention will be apparent from the following description when read in connection with the accompanying drawings, wherein—

Figure 1:
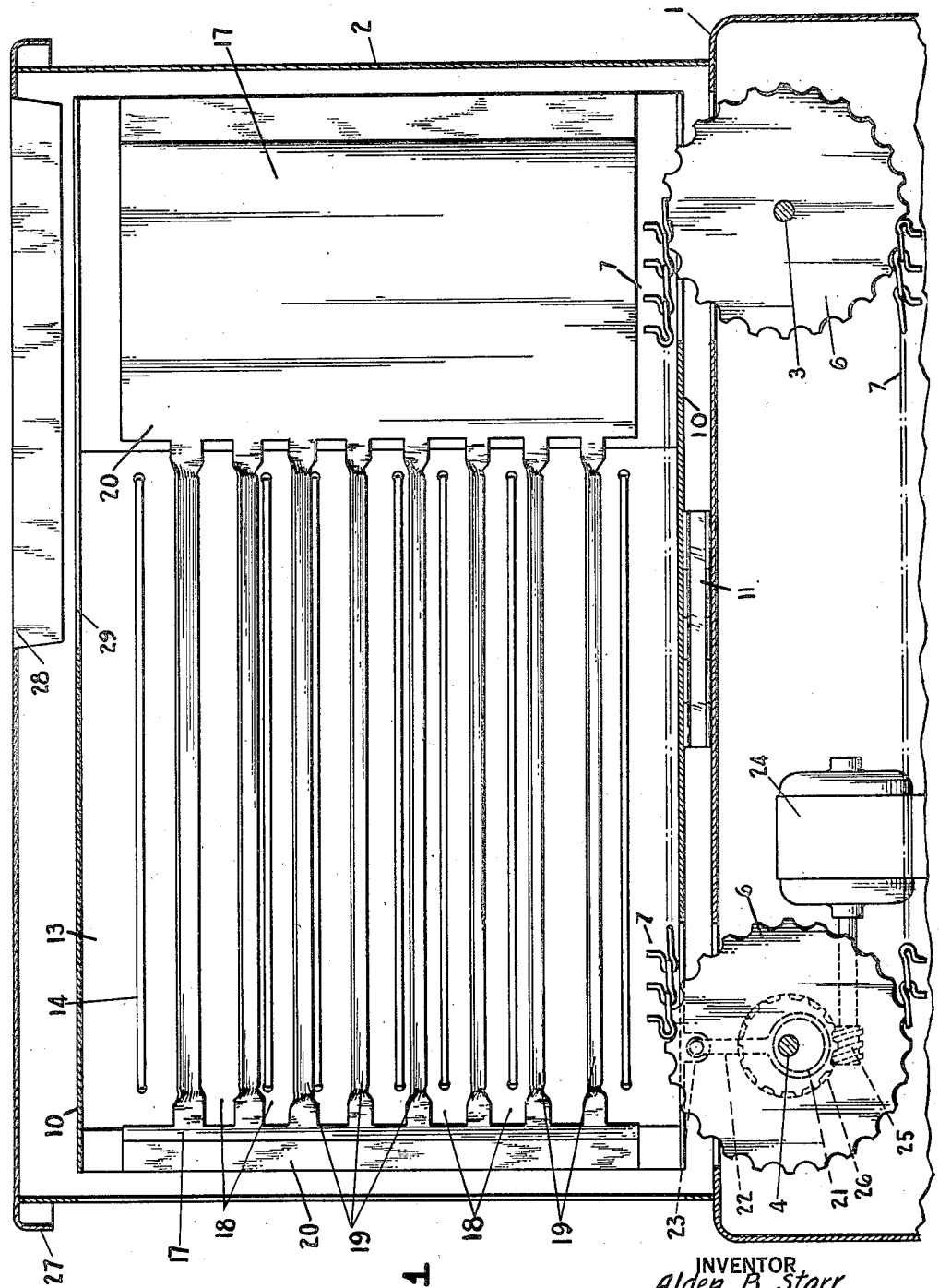
Figure 1 is a view in vertical section of one embodiment of my invention, parts being broken away to facilitate illustration.

Referring to the figures, I provide a base 1 which may be a stamping or member formed of drawn metal. Mounted upon the base 1, I provide a casing 2, which also may be formed of sheet metal, and within which is positioned the toasting oven and conveyor elements more fully described hereinafter.

Within the base member 1 are a pair of shafts 3 and 4 mounted in suitable bearings members 5, carried by the walls of the base 1. Upon the shafts 3 and 4 are mounted sprocket wheels 6 which are provided with suitable teeth for engaging an endless conveyor chain 7, that spans the space between sprockets 6 and thus extends the full length of the toaster.

Within the casing 2 is positioned a frame 8, which carries and encloses the heater or toasting elements and the guide members. The frame 8 may consist of upright side walls 9 as indicated, and top and bottom members 10 appropriately joined together. From Fig. 1 it will be noted sprocket wheels 6 project through openings in the bottom 10 so that one flight of the chain passes through the oven of the toaster enclosed by the frame 8 and about to be described. Within the frame 8 is mounted a pair of heat producing members 12, which are desirably electric resistor units mounted face to face. One form shown consists of a mica support 13 carrying the electric resistor unit, such as nichrome ribbon 14. The heater units are shown attached to the frame 8 by appropriately distributed bolts and spacers 15 and 16.

Figure 2:
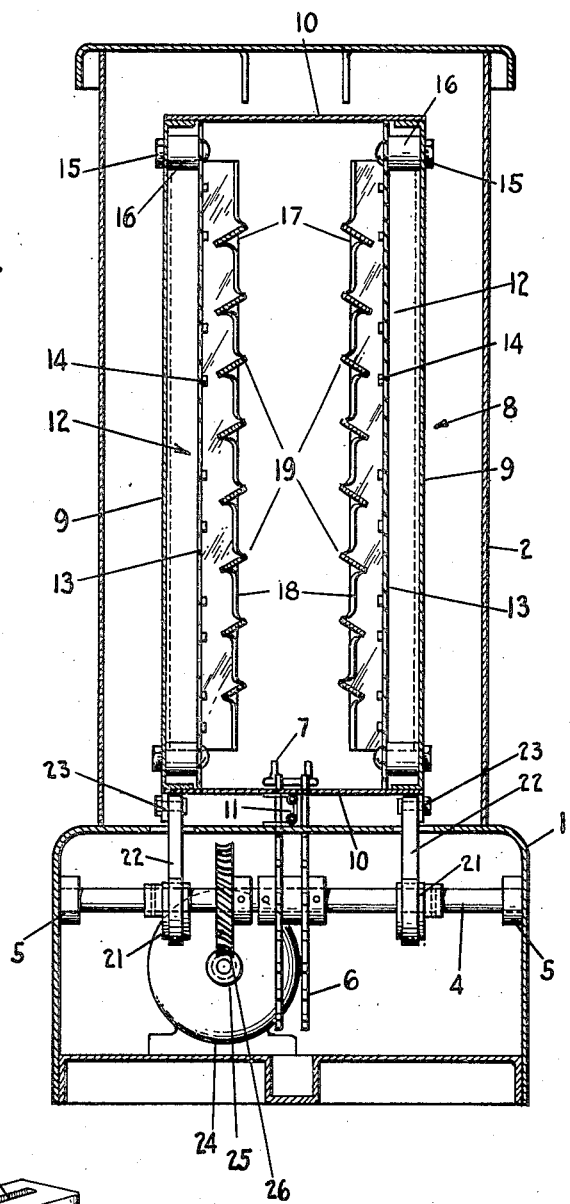
Fig. 2 is an end view from the discharge end of my toaster, the outer casing and oven being shown in cross section.

A pair of spacing and guiding members 17 are also mounted within the frame 8 on either side of the conveyor chain 7. The guide members 17 may consist of one-piece sheet metal members, in which appropriate openings 18 are punched to permit passage of heat from the heat members 12. The resultant strips 19 extend between a pair of end members 20. The strips are of varying widths decreasing from top to bottom, as shown in Fig. 2, the uppermost strip 19 extending almost to the face of the heater 12. However, the inner edges of the strips 19 are in the same vertical plane and spaced equi-distant from the center line of the oven. The strips 19 are also twisted to an angle out of the original vertical plane of the metal, so as to present an upwardly inclined surface extending from the heaters 12 to the center of the oven. While the guide 17 has been described as made of a one-piece stamping it is apparent this construction need not be adhered to. The frame 8 comprising the oven is pivoted upon a suitable type of pivot 11 which is shown as a double hinge, but may consist of any desired or appropriate type of pivoted bearing member.

Upon the shaft 4 a pair of eccentrics 21 are mounted on opposite sides of sprocket wheel 6. The eccentrics 21 have eccentric straps 22 secured thereto and respectively pivotally attached to ears 23 depending from the bottom of the frame 8 on opposite sides of the vertical center thereof. The eccentrics are respectively secured to the shaft 4 so that the maximum throws thereof are diametrically opposed.

A source of power is provided for driving the shaft 4, which may be any convenient device, but in the embodiment shown is an electric motor 24 mounted within the base 1 and connected to the shaft 4 through a worm 25 and gear 26.

Figure 3:
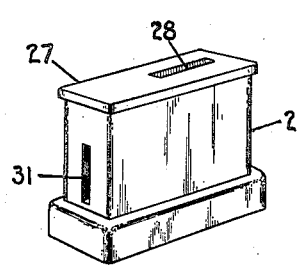
Fig. 3 is a perspective view of the exterior of my toaster.

Referring to Fig. 3, the casing 2 has a cover plate 27 in which is an opening 28 which registers with an opening 29 in the frame top plate 9 (Fig. 1). Opening 28 is the feed opening for the bread. In one end of the casing 2 is an opening 31 which is the delivery opening for the toast.

In the operation of my device, the motor 24 drives the shaft 4 and its sprocket wheel 6 and thereby draws the chain 7 along the length of the toaster, through the chamber formed by the auxiliary frame 8. The slice of bread to be toasted is inserted through the openings 28 and 29 and dropped upon the chain 7. The bread is carried at a low speed between the heater elements 14 and the guide members 19, where it is subjected to the toasting heat. Of course, the speed of the motor and therefore the speed of chain 7 may be controlled by any suitable means according to the user's desire for dark or light toast.

The slice of bread being toasted does not fill the space between the guide members 17 so that the bread will lean upon one or the other of the guides 17, and both sides are not evenly and satisfactorily toasted. The thinner the slice of bread, the greater will be the uneven toasting. Eccentrics 21 overcome this difficulty.

Simultaneously with the movement of the chain, the eccentrics 21 are rotated and produce an oscillating motion of the frame 8 and oven, from side to side about the pivot 11. Hence, the bread, as it stands upon the chain 7, is tilted from side to side, first upon the one guide 17, and then after passage of a short time, over against the other guide 17. In this way alternate sides are brought alternately closely to the heater members 14, and hence the bread is more evenly toasted on both sides.

As the bread is being toasted, the guide strips 19 serve as deflectors to throw the stream of heat upward and inward against the sides of the toast. The fact that the upper guide strips 19 are wider than the lower ones results in distributing the heat to secure a more uniform and satisfactory toasting between the top and bottom edges, and what is much more important uses all the heat permitting very little of to escape through the top of the chimney between each guide 17, and the adjacent heater body 12.

By the foregoing means I am thus enabled to obtain a much more uniform and satisfactory toasting of the slice of bread during its passage through the toaster. I have likewise produced a toaster which is made up of simple and easily formed parts, and which in spite of its simplicity and light construction is extremely durable and rugged.

While I have shown but a single embodiment of the device of my invention, it is capable of various modifications without departure from the spirit thereof, and I desire therefor that only such limitations shall be imposed upon the appended claims as are stated therein or required by the prior art.

I claim:

1. In a toaster device, a conveyor chain, a chamber through which the chain is moved, a pair of heat producing elements mounted in the chamber, and vibrating guide members mounted in said chamber between said heat producing elements.

2. A toaster device, comprising a vibrating frame, a plurality of inclined strip members attached thereto and vibrating therewith, and a source of heat, said strip members serving to deflect heat from said source onto a toastable substance.

3. In a toaster device, a conveyor chain, a chamber through which the chain is moved, opposite heat producing elements mounted in the chamber, guide members mounted in said chamber between said heat producing elements, and means for oscillating the chamber about a pivot.

4. In a toaster device, opposed heating elements, guard means for said heater elements, and means for tilting the bread first toward one of said heater elements and then toward the other during the toasting period.

5. In a toaster device, opposed heater elements, guard members therefor, means for connecting said heater elements together, and means for tilting said heater elements from side to side so as to cause a slice of bread to lean first toward one heater element and then the other during the toasting period.

6. In a toaster device, opposed heating elements, means for carrying slices of bread between said heater elements, and means for tilting the slices of bread first toward one heater element and then toward the other as the bread is carried therebetween.

7. In a toaster device, opposed heating elements, means for conveying a slice of bread between said heating elements, and means for continuously moving the heating elements from side to side and both in the same direction as the slices of bread are moved therebetween.

8. In a toaster device, a pivotally mounted frame, opposed heating elements mounted thereon, a chain for carrying a slice of bread between said heating elements, motive means for said chain, and an eccentric operated by said motive means and connected to said frame so as to move the frame about its pivot.

9. A toaster device comprising, in combination, a base, a pair of shafts positioned therein, sprocket wheels upon said shafts, a conveyor chain carried and positioned upon said sprockets, driving means for the rotation of said shafts and the movement of said conveyor chain, a main chamber mounted upon said base, an auxiliary chamber pivotally mounted in said main chamber, oscillating means for the auxiliary chamber comprising mechanical means operated from one of said shafts, heater members within said auxiliary chamber, and guard members also mounted therein adjacent to said heater members and comprising a plurality of strip members positioned at an angle to the horizontal and adapted to deflect heat from said heater members toward the center of said auxiliary chamber.

10. In a toaster device, the combination of a pair of electric heat producing elements, heat resistant supporting members therefor, guard members cooperating therewith comprising a plurality of strips of metal inclined at a small angle to said supporting means, an auxiliary container comprising a frame in which the heat elements and guard members are supported, a main container therearound, a conveyor chain adapted to have an upper stretch passing through said frame, means for driving said conveyor chain through said auxiliary container, and means for producing a vibratory motion of said auxiliary container.

11. In a toaster, a pair of oscillatable heating elements, a conveyor for moving a slice of bread therebetween and power means for actuating said conveyor and for alternately oscillating said heating elements in opposite sidewise directions during such actuating.

12. In a toaster, a pair of oscillatable heating elements and means for continuously and alternately oscillating said heating elements in opposite sidewise directions during the toasting operation.

13. In a toaster, a pair of movable heating elements, guide means carried thereby and movable therewith and means for continuously and alternately moving said heating elements and said guide means in opposite sidewise directions during the toasting operation.

14. In a toaster, a frame, a substantially flat vertically arranged heating element therein, a bread support and a heat deflector between said heating element and said bread support comprising a horizontally slotted plate arranged in a plane substantially parallel with the plane of the heating element, the bar-like elements of said plate between successive slots being twisted to slant upwardly away from said heating element and toward the slice of bread on said bread support.

15. In a toaster, a frame, a substantially flat vertically arranged heating element therein, a bread support and a heat deflector between said heating element and said bread support comprising a horizontally slotted plate arranged in a plane substantially parallel with the plane of the heating element, the bar-like elements of said plate between successive slots being twisted to slant upwardly away from said heating element and toward the slice of bread on said bread support and the lower bar-like elements being spaced further from said heating element than the upper ones.

ALDEN B. STARR.